(12) United States Patent
Takahashi

(10) Patent No.: US 7,171,087 B2
(45) Date of Patent: Jan. 30, 2007

(54) OPTICAL FIBER CABLE

(75) Inventor: Yoshihiro Takahashi, Tokyo (JP)

(73) Assignee: Hitachi Cable, Ltd., Tokyo (JP)

(\*) Notice: Subject to any disclaimer, the term of this patent is extended or adjusted under 35 U.S.C. 154(b) by 136 days.

(21) Appl. No.: 11/085,029

(22) Filed: Mar. 21, 2005

(65) Prior Publication Data
US 2005/0238299 A1   Oct. 27, 2005

(30) Foreign Application Priority Data
Mar. 29, 2004   (JP) .............. 2004-094047

(51) Int. Cl.
G02B 6/44   (2006.01)
(52) U.S. Cl. .............. 385/106; 385/100; 385/102; 385/103; 385/123; 385/125
(58) Field of Classification Search ........ 385/100–115, 385/123, 125
See application file for complete search history.

(56) References Cited

U.S. PATENT DOCUMENTS

| 3,402,055 | A | 9/1968 | Harris et al. | |
| 6,611,646 | B1 * | 8/2003 | Norris et al. | 385/113 |

FOREIGN PATENT DOCUMENTS

| JP | 2503790 Y2 | 4/1996 |
| JP | 10-10382 A | 1/1998 |
| JP | 11-23925 A | 1/1999 |
| JP | 2000-199840 A | 7/2000 |
| JP | 2000-241681 A | 9/2000 |
| JP | 2001-083385 A | 3/2001 |
| JP | 2003-015000 A | 1/2003 |
| JP | 2003-107307 A | 4/2003 |

\* cited by examiner

Primary Examiner—Frank G. Font
Assistant Examiner—Michael P. Mooney
(74) Attorney, Agent, or Firm—Foley & Lardner LLP

(57) ABSTRACT

An optical fiber cable has an optical fiber core wire and a tension member. The tension member is formed of a glass fiber reinforced resin linear material with glass fibers and a matrix resin, and satisfies the following requirements: (1) $(E_fV_f+E_mV_m)d^2 \geq 8.3/n$ wherein $E_f$ represents the modulus of elasticity of glass fibers, GPa; $V_f$ represents the content of glass fibers, %/100; $E_m$ represents the modulus of elasticity of matrix resin, GPa; $V_m$ represents the content of matrix resin, %/100; d represents the diameter of tension member, mm; and n represents the number of tension members used in optical fiber cable; (2) $(E_f/E_m) \geq 22$; (3) $V_f = 0.6$ to $0.88$; and (4) an elongation at break of glass fibers of not less than 5% and an elongation at break of matrix resin of not less than 5%.

9 Claims, 3 Drawing Sheets

3: YARN
10: CREEL
11a, 11b: GUIDE
12: IMPREGNATION TANK
13: SQUEEZING NOZZLE
14: MOLD
15: CATERPILLAR
16: WINDING DEVICE

OPTICAL FIBER CABLE

The present application is based on Japanese patent application No. 2004-094047, the entire contents of which are incorporated herein by reference.

BACKGROUND OF THE INVENTION

1. Field of the Invention

The invention relates to an optical fiber cable. More particularly, the invention relates to an optical fiber cable using a tension member comprising organic or inorganic reinforcing fibers.

2. Description of the Related Art

An optical fiber cable is a cable comprising a plurality of converged optical fibers and has become rapidly widely used, for example, in offices and large apartments in Japan. In the optical fiber cable, tension members are used for preventing the optical fibers from being elongated to a level beyond the specified limit. Such optical fiber cables are described, for example, in Japanese Patent Laid-Open Nos. 15000/2003, 241681/2000, 107307/2003, and 23925/1999, Utility Model Registration No. 2503790, and Japanese Patent Laid-Open Nos. 199840/2000, 10382/1998, and 83385/2001.

Tension members used include aramid fiber reinforced resins (see, for example, Japanese Patent Laid-Open No. 199840/2000), glass fiber reinforced resins (see, for example, Japanese Patent Laid-Open No. 10382/1998), and steel wires coated with an enamel layer (see, for example, Japanese Patent Laid-Open No. 83385/2001).

In recent years, with the spread of FTTH, optical fiber cables have become used, for example, in main lines and branch lines, as well as in general buildings. This had led to a demand for optical fiber cables having excellent laying workability and handleabiity, that is, optical fiber cables in which the optical fibers exhibit excellent tensile and bend loss properties during handling.

Optical fibers used in this optical fiber cable include, for example, single mode fibers having a specific refractive index difference of 0.29% to 0.37% and a mode field diameter of not more than 8.8 μm. In optical fibers having the above specific refractive index difference and mode field diameter, light is surely confined in the core, and, thus, excellent bend loss properties are provided. Examples of other optical fibers include holey optical fibers comprising a clad having a plurality of holes. In the holey optical fibers, the provision of the plurality of holes in the clad increases the substantial specific refractive index difference to further ensure the confinement of light in the core. According to this construction, better bend loss properties than those of the conventional optical fibers can be realized.

This improvement in properties of the optical fibers has led to a demand for tension members having higher flexibility and excellent bending properties.

For example, tension members formed of aramid fiber reinforced resin may be mentioned as flexible tension members. AS compared with tension members formed of a glass fiber reinforced resin, however, these tension members are disadvantageous in that the minimum bending diameter (a limit diameter which causes a fracture of the tension member upon bending in an arc form) is large and the level of the so-called "curling," which is such a phenomenon that, when the tension member is wound around a bobbin and rewound for use, the tension member is curved to a level corresponding to the winding diameter of the bobbin, is large. In the above-described Japanese Patent Laid-Open No. 199840/2000, a vinyl ester resin containing a peroxide catalyst is used as the matrix resin.

The use of a glass fiber reinforced resin instead of the aramid fiber reinforced resin is considered effective. However, none of tension members formed of a glass fiber reinforced resin have such a high level of flexibility that the minimum bending diameter D is less than 20 times the diameter d of the glass fiber reinforced resin linear material. In Japanese Patent Laid-Open No. 10382/1998, a tension member formed of glass fibers having an outer diameter d of 0.252 mm is described as a comparative example. The minimum bending curvature D is 6 to 7 mm, and D/d is not less than 20. In the working example of Japanese Patent Laid-Open No. 10382/1998, a methacrylic ester monomer-containing novolak vinyl ester resin is used as the matrix resin.

Thus, the realization of an optical fiber cable using a tension member having a higher level of flexibility using a glass fiber reinforced resin having a lower level of curling than the aramid fiber reinforced resin has been desired.

Several excellent properties are also required of the matrix resin constituting the glass fiber reinforced resin.

For example, in general, the production speed of an extra-fine tension member having a diameter of not more than 0.6 mm is not less than 1 m/min. From the viewpoint of the size of the mold and production equipment, however, the curing time cannot be brought to not less than 10 min. For this reason, the curing reaction of the matrix resin is generally carried out at an atmosphere temperature of 200° C. or below for 10 min or shorter, preferably for 5 min or shorter, more preferably 3 min or shorter, and, thus, the matrix resin desirably has a high curing speed.

Further, the viscosity of the uncured matrix resin composition is desirably low. This is because, when the viscosity of the resin composition is high, the penetration of the resin composition into gaps between glass fibers is difficult. When the glass fibers are finer, the penetration of the resin composition into yarns of a plurality of glass fibers is more difficult.

Furthermore, the use of tension members using an unsaturated polyester resin or a vinyl ester resin as the matrix resin sometimes poses a problem in post processing as an optical fiber cable. Specifically, in the step of coating a thermoplastic resin in the production of an optical fiber cable, in some cases, upon heat treatment, styrene gas or the like is evolved from the tension member, resulting in expansion of the optical fiber cable.

Up to now, any thermoplastic resin satisfying the above requirements for a high curing time, highly strong and highly elastic mechanical properties and low viscosity properties has not been developed.

Extensive and intensive studies have been made with a view to developing an optical fiber having excellent bending properties and using a tension member formed of a glass fiber reinforced resin having improved bending properties and flexibility, which has led to the completion of the invention.

SUMMARY OF THE INVENTION

It is an object of the invention to solve the above problems of the prior art and to provide an optical fiber cable satisfying requirements for excellent flexibility and bending properties using a tension member formed of a glass fiber reinforced resin linear material.

(A) According to the first feature of the invention, an optical fiber cable comprises: an optical fiber core wire; and a tension member, said tension member being formed of a glass fiber reinforced resin linear material comprising glass fibers and a matrix resin, said glass fiber reinforced resin linear material satisfying the following requirements:

(1) $(EfVf+EmVm)d^2 \geq 8.3/n$ wherein Ef represents the modulus of elasticity of glass fibers, GPa; Vf represents the content of glass fibers, %/100; Em represents the modulus of elasticity of matrix resin, GPa; Vm represents the content of matrix resin, %/100; d represents the diameter of tension member, mm; and n represents the number of tension members used in optical fiber cable;

(2) $(Ef/Em) \geq 22$;

(3) $Vf=0.6$ to $0.88$; and (4) an elongation at break of glass fibers of not less than 5% and an elongation at break of matrix resin of not less than 5%.

Em is preferably not less than 2 GPa.

The ratio of the elongation at break of the matrix resin to the elongation at break of the glass fibers (elongation at break of the matrix resin/elongation at break of the glass fibers) is preferably 0.93 to 1.27.

The ratio of the minimum bending diameter D of the glass fiber reinforced resin linear material to the diameter d of the glass fiber reinforced resin linear material, D/d, is preferably not more than 20.

d is preferably not more than 0.6 mm.

In the glass fiber reinforced resin linear material, preferably, the glass fibers have an elongation at break of not less than 5%, and the matrix resin has been prepared by curing, with a thermal cationic polymerization catalyst or an acid anhydride, a liquid epoxy resin having a viscosity of not more than 15000 mPa·s at 25° C. before curing.

Preferably, the optical fibers in the optical fiber core wire are single mode fibers having a mode field diameter of 8.0 to 8.8 μm or less.

Preferably, the optical fibers in the optical fiber core wire have a plurality of holes in the periphery of the core.

(B) According to the second feature of the invention, an optical fiber cable comprises: an optical fiber core wire; and a tension member, said tension member being a glass fiber reinforced resin linear material comprising glass fibers having an elongation at break of not less than 5% and a matrix resin prepared by curing, with a thermal cationic polymerization catalyst or an acid anhydride, a liquid epoxy resin having a viscosity of not more than 15000 mPa·s at 25° C. before curing.

<Advantages of the Invention>

The optical fiber cable according to the invention comprises: an optical fiber core wire; and a tension member, said tension member being formed of a glass fiber reinforced resin linear material comprising glass fibers and a matrix resin, said glass fiber reinforced resin linear material satisfying the following requirements: (1) $(EfVf+EmVm)d^2 \geq 8.3/n$ wherein Ef represents the modulus of elasticity of glass fibers, GPa; Vf represents the content of glass fibers, %/100; Em represents the modulus of elasticity of matrix resin, GPa; Vm represents the content of matrix resin, %/100; d represents the diameter of tension member, mm; and n represents the number of tension members used in optical fiber cable, (2) $(Ef/Em) \geq 22$, (3) $Vf=0.6$ to $0.88$, and (4) an elongation at break of glass fibers of not less than 5% and an elongation at break of matrix resin of not less than 5%. By virtue of the above construction, an optical fiber cable which comprises a tension member formed of the glass fiber reinforced resin linear material having a high level of flexibility and is excellent in bending properties and flexibility can be realized. Specifically, an optical fiber cable having excellent bending properties and flexibility can be realized using a tension member formed of a glass fiber reinforced resin linear material having a ratio of a minimum bending diameter D to diameter d of the glass fiber reinforced resin linear material, D/d, of not more than 20. Further, the use of a tension member formed of a glass fiber reinforced resin linear material having a diameter d of not more than 0.6 mm can realize an optical fiber cable having excellent bending properties and flexibility, particularly a drop cable usable in wiring of houses, buildings and the like.

Further, in the optical fiber cable according to the invention, regarding the glass fiber reinforced resin linear material as the tension member, the glass fibers have an elongation at break of not less than 5%, and the matrix resin has been prepared by curing, with a thermal cationic polymerization catalyst or an acid anhydride, a liquid epoxy resin having a viscosity of not more than 15000 mPa·s at 25° C. By virtue of the above construction, a glass fiber reinforced resin linear material satisfying the above requirements (1) to (4) can be realized, and an optical fiber cable having excellent bending properties and flexibility can be formed.

Furthermore, since the epoxy resin is used as the matrix resin, upon heat treatment in the step of coating a thermoplastic resin in post processing as an optical fiber cable, for example, styrene gas which exerts an adverse influence is not evolved, and, thus, a very good optical fiber cable can be obtained by the processing.

BRIEF DESCRIPTION OF THE DRAWINGS

The preferred embodiments according to the invention will be explained below referring to the drawings, wherein.

DESCRIPTION OF THE PREFERRED EMBODIMENTS

Preferred embodiments of the optical fiber cable according to the invention will be explained in conjunction with FIGS. 3 and 4. It should be noted that the optical fiber cable according to the invention is not limited to the following preferred embodiments.

Figure 3:
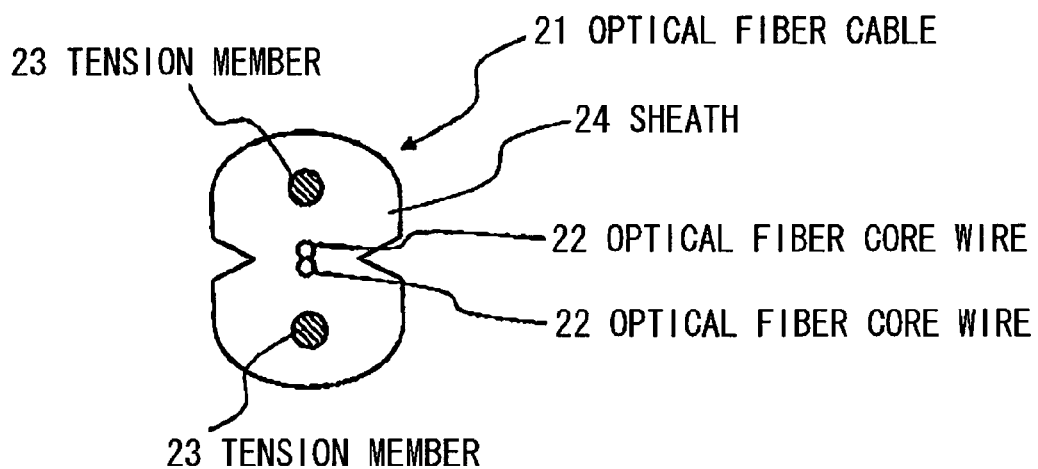
FIG. 3 is a cross-sectional view of a preferred embodiment of the optical fiber cable according to the invention.

FIG. 3 shows a first preferred embodiment of the optical fiber cable according to the invention. An optical fiber cable 21 in this preferred embodiment includes a sheath 24 with an oval sectional form. Two tension members 23 are disposed within the sheath 24. An optical fiber core wire 22 is disposed in the center part between the tension members 23. The optical fiber core wire 22 is preferably single mode fibers having a mode field diameter of 8.0 to 8.8 μm. Alternatively, holey optical fibers comprising a clad with a plurality of holes may be used. Since the optical fibers have excellent bend loss properties, even when the optical fiber cable is greatly bent, the optical loss can be suppressed to a low level. The tension member 23 is formed of a glass fiber reinforced resin linear material. The tension member 23 may be coated with a thermoplastic resin, for example, a polyolefin, a polyester, or a polyamide. The sheath is provided with a notch for taking out the optical fiber core wire. The optical fiber cable in this preferred embodiment may be used, for example, in wiring of general houses and buildings (known also as "drop cable").

Figure 4:
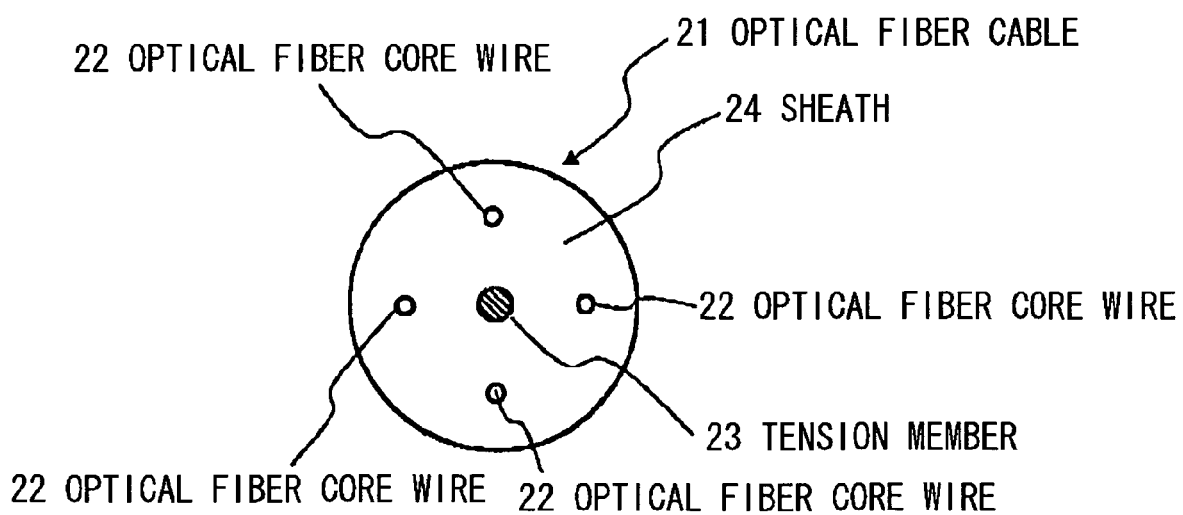
FIG. 4 is a cross-sectional view of another preferred embodiment of the optical fiber cable according to the invention.

FIG. 4 shows a second preferred embodiment of the optical fiber cable according to the invention. An optical fiber cable 21 in this preferred embodiment includes a circular sheath 24. In the sheath 24, four optical fiber core wires 22 are disposed around the tension member 23. The tension member 23 is formed of a glass fiber reinforced resin linear material.

In the case of quartz-based optical fibers, strength is deteriorated due to static fatigue derived from tensile stress on the glass surface, leading to breaking of the optical fibers. To overcome this problem, in the optical fiber cable, the tensile strain governing the service life of the optical fibers which is the time elapsed until the breaking is reduced by using a tensile-strength material, that is, the so-called "tension member". The service life of the optical fibers is calculated by the following estimate equation (Mitsunaga et al.: "Sukuriningu Shiken Niyoru Hikari Faiba Kyoudo Shikenhou (Optical fiber strength testing method utilizing screening test)," DENSHI JOHO TUSHIN GAKKAI RONBUNSHI (The IEICE Transactions), J66-B, No. 7):

$$Tr = \left[\left\{1 - \frac{\ln(1-F)}{L \cdot Np}\right\} - 1\right]^{\frac{n-2}{m}} \left[\frac{\varepsilon p}{\varepsilon r}\right]^n \cdot tp$$

wherein
Tr: time elapsed until breaking of the optical fibers,
εr: tensile strain,
L: overall length of fibers,
F: probability of breaking,
Np: probability of breaking in proof test,
εp: proof strain,
tp: proof time,
m: slope of accumulative breaking distribution, and
n: coefficient of fatigue.

The tolerable tensile strain εr is calculated by this equation using preset estimated service life (number of years) and various parameters. From the viewpoint of practical use of the optical fiber cable, the tensile strain εr has hitherto been required to be not less than 0.2% and, in recent years, has been required to be not less than 0.3%.

During working, for example, during layering or wiring, and due to ambient environmental conditions after laying (for example, wind pressure), various types of tension are applied to the optical fiber cable. Therefore, the minimum tolerable tension which does not sacrifice workability at the time of laying, wiring and the like and can withstand at least ambient environmental conditions after laying is required of the optical fiber cable. The minimum tolerable tension should be not less than 2.0 kgf from the viewpoint of practical use of the optical fiber cable. The minimum tolerable tension is preferably not less than 2.6 kgf.

The tolerable tension of the optical fiber cable depends upon the tolerable tension of the tension member, and the tolerable tension T of the tension member is expressed by $$T = EA\varepsilon r$$

wherein E represents the tensile modulus of elasticity; A represents the sectional area of tension member; and εr represents the above tolerable tensile strain.

The glass fiber reinforced resin linear material used as the tension member in the optical fiber cable according to the present invention comprises glass fibers and a matrix resin. E is expressed by $$E = EfVf + EmVm$$

wherein Ef represents the modulus of elasticity of the glass fibers; Vf represents the content of the glass fibers; Em represents the modulus of elasticity of the matrix resin; and Vm represents the content of the matrix resin. The sectional area A is expressed by $A = \pi(d/2)^2$ wherein d represents the diameter of the tension member. Therefore, the tolerable tension T of the tension member is expressed by $$T = (EfVf + EmVm)\pi(d/2)^2 \varepsilon r.$$

Accordingly, the glass fiber reinforced linear material used as the tension member in the optical fiber cable of the invention satisfies the following relationship:

$$(EfVf + EmVm)d^2 \geq 4T/1.02 \pi \varepsilon r$$

wherein εr represents tensile strain required in actual use of the optical fiber cable, %/100; T' represents tolerable tension required in actual use of the optical fiber cable, kgf; Ef represents the modulus of elasticity of the glass fibers, GPa; Vf represents the content of the glass fibers, %/100; Em represents the modulus of elasticity of the matrix resin, GPa; Vm represents the content of the matrix resin, %/100; and d represents the diameter of the glass fiber reinforced resin linear material, mm (1 GPa=$1.02 \times 10^4$ kgf/cm$^2$). In this case, n is the number of tension members used in the optical fiber cable (for example, in the case of drop cable, n=2). When the tensile strain is 0.3 and the tolerable tension is 2.0 kgf, (EfVf+EmVm)d$^2$ is preferably not less than 8.3/n. When the tensile strain is 0.3 and the tolerable tension is 2.6 kgf, (EfVf+EmVm)d$^2$ is preferably not less than 10.8/n. When the tensile strain is 0.2 and the tolerable tension is 2.0 kgf, (EfVf+EmVm)d$^2$ is preferably not less than 12.5/n. When the tensile strain is 0.2 and the tolerable tension is 2.6 kgf, (EfVf+EmVm)d$^2$ is preferably not less than 16.3/n. The upper limit of the diameter d of the tension member is such a value that the tension member can be received in the optical fiber cable used. When the optical fiber cable is used in wiring in houses and buildings, the d value is preferably not more than 0.6 mm.

The glass fiber reinforced resin linear material used in the tension member of the optical fiber cable according to the invention is formed of glass fibers and a matrix resin, which satisfy a requirement for an elongation at break of the glass fibers of not less than 5%, a requirement for an elongation at break of the matrix resin of not less than 5%, and a ratio of the modulus of elasticity of the glass fibers, Ef, to the modulus of elasticity of the matrix resin, Em, of not less than 22. Since the glass fibers have an elongation at break of not less than 5%, that is, has a high modulus of elasticity, the flexibility is excellent. Further, since the glass fibers are anchored with the matrix resin having a modulus of elasticity satisfying an Ef/Em ratio of not less than 22, the glass fiber reinforced resin linear material can be formed without sacrificing the flexibility of the glass fibers. Therefore, the tension member has excellent flexibility.

The glass fiber reinforced resin linear material used in the tension member of the optical fiber cable according to the invention preferably satisfies a requirement for a ratio of the elongation at break of the glass fibers to the elongation at break of the matrix resin (elongation at break of the matrix resin/elongation at break of the glass fibers) in the range of 0.93 to 1.27. When the ratio is in this range, the difference between the elongation at break of the glass fibers and the elongation at break of the matrix resin is small. Therefore, the lowering in bending properties attributable to the above difference can be suppressed, and a glass fiber reinforced resin linear material having excellent flexibility can be formed.

In the relationship between the content of the glass fibers, Vf, and the content of the matrix resin, Vm, constituting the glass fiber reinforced resin linear material (Vf+Vm=1), the content of the glass fibers, Vf, is preferably not less than 0.6 and not more than 0.88. When the Vf value is less than 0.6, the content of the glass fibers is excessively low and the required strength cannot be provided without difficulties. On the other hand, when the Vf value exceeds 0.88, the content of the matrix resin is so low that the anchoring of the glass fibers with the matrix resin becomes difficult. The Vf value is preferably not less than 0.65 and not more than 0.80.

Next, preferred embodiments of the glass fiber reinforced resin linear material used as the tension member in the optical fiber cable according to the invention will be explained.

Figure 1:
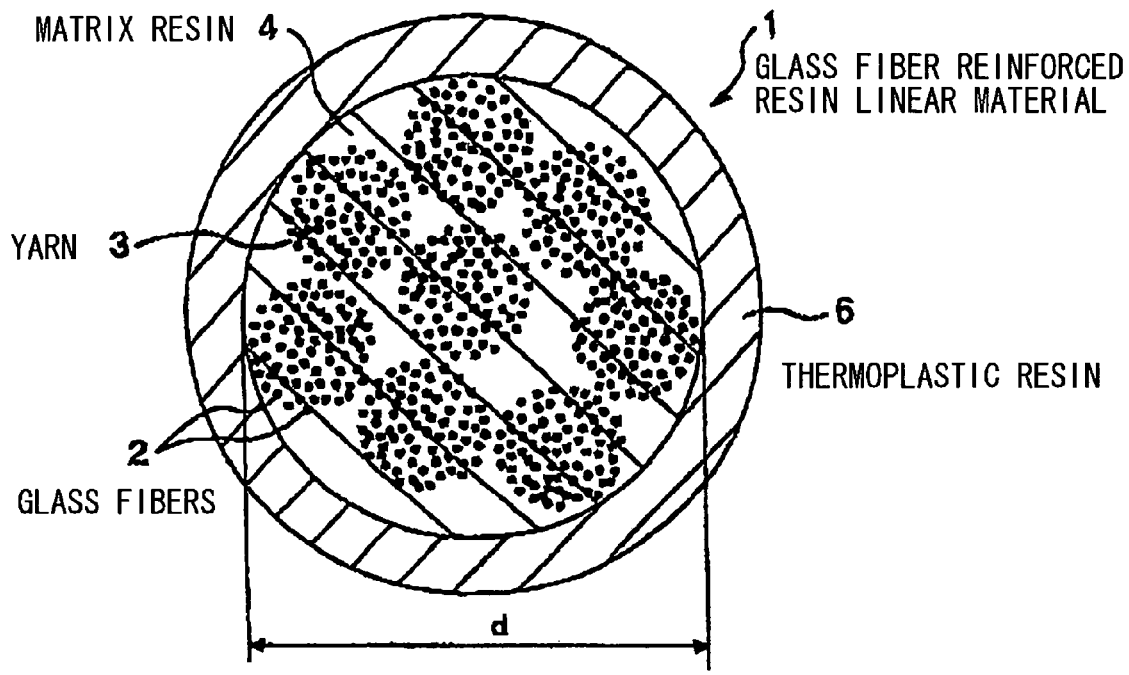
FIG. 1 is a cross-sectional view of a preferred embodiment of a glass fiber reinforced resin linear material for use as a tension member of the optical fiber cable according to the invention.

As shown in FIG. 1, a glass fiber reinforced resin linear material 1 according to the invention includes glass fibers 2 and a matrix resin 4. 30 to 100 monofilaments of glass fibers 2 may constitute a yarn 3. Preferably, 30 to 80 monofilaments of glass fibers 2 constitute a yarn 3. The cross section of the yarn 3 is preferably substantially circular. One yarn 3 may be or may not be in contact with another yarn 3. The glass fiber reinforced resin linear material 1 preferably contains 4 to 15 yarns, more preferably 5 to 12 yarns. The diameter of the glass fiber reinforced resin linear material 1 is preferably not more than 0.6 mm, more preferably not more than 0.55 mm. In the invention, even the fine glass fiber reinforced resin linear material can hold satisfactory tensile strength. The diameter of the glass fiber reinforced resin linear material 1 is preferably not less than 0.1 mm, more preferably not less than 0.2 mm.

The outer periphery of the matrix resin 4 is optionally coated with the thermoplastic resin 6. Thermoplastic resins usable herein include, for example, polyolefins, polyesters, and polyamides. Among them, polyolefins such as polyethylene are preferred. The thermoplastic resin 6 is not indispensable.

In the invention, the elongation at break of the glass fibers is not less than 5.0%. According to this construction, the glass fiber reinforced resin linear material has a high level of flexibility, and the minimum bending diameter can be reduced. The elongation at break of the glass fibers is measured by "General testing method for glass fibers, (4) tensile strength" specified in JIS R 3420. In some literatures, the elongation at break is sometimes called "maximum elongation."

The modulus of elasticity of the glass fibers is preferably not less than 70 GPa, more preferably not less than 80 GPa, from the viewpoint of imparting a high level of flexibility to the glass fiber reinforced resin linear material and reducing the minimum bending diameter.

For example, a glass composition comprising 55 to 79.9% by weight of $SiO_2$, 12.6 to 32% by weight of $Al_2O_3$, and 4 to 20% by weight of MgO may be mentioned as glass fibers having the above physical properties. This glass composition may contain less than 1% by weight of $ZrO_2$. For example, glass fibers as described in U.S. Pat. No. 3,402,055 may be used. High-strength glass fibers (tradename: "T-GLASS") sold by Nitto Boseki Co., Ltd. are suitable as the glass fiber.

Preferably, the surface of the glass fibers has been treated with epoxysilane. This treatment can improve wettability at the interface of the glass fibers and the matrix resin.

The matrix resin contained in the glass fiber reinforced resin linear material according to the invention has been prepared by curing, with a thermal cationic polymerization catalyst or an acid anhydride, a liquid epoxy resin having a viscosity of not more than 15000 mPa·s at 25° C. This matrix resin, even when not reinforced with the glass fibers, has improved elongation at break and modulus of elasticity.

Further, since the liquid epoxy resin has a viscosity of not more than 15000 mPa·s at 25° C., the uncured resin composition has good wettability with the glass fibers and, upon curing, has good adhesion to the glass fibers.

Preferably, the elongation at break, λ, of the matrix resin is not less than 5.0%, and the modulus of elasticity of the matrix resin is not less than 2 GPa. When these requirements are satisfied, the ratio of the diameter D of the limit bending which does not cause breaking of the glass fiber reinforced resin linear material to the diameter d of the glass fiber reinforced resin linear material, D/d, is stably not more than 20. The D/d value is preferably not less than 10, more preferably not less than 12. Regarding the physical properties of the matrix resin, in such a state that the glass fiber is not contained, the resin composition is cured to form a matrix resin which is then measured for the elongation at break and the modulus of elasticity.

Only one type of the liquid epoxy resin may be used. Alternatively, a mixture of two or more liquid epoxy resins may be used. When a mixture of two or more liquid epoxy resins is used, a viscosity of at least one liquid epoxy resin of not more than 15000 mPa·s at 25° C. suffices for contemplated results. The viscosity of the whole mixture of two or more liquid epoxy resins is preferably not more than 15000 mPa·s at 25° C.

The uncured resin composition contains, in addition to the liquid epoxy resin, a curing agent (thermal cationic polymerization catalyst or acid anhydride) and optionally other ingredients. The viscosity of the uncured resin composition is preferably not more than 10000 mPa·s at 25° C. When the viscosity of the uncured resin composition is lower, the uncured resin composition can be more easily penetrated into between the glass fibers.

The "uncured resin composition" as used herein refers to a resin composition before heat curing, typically a resin composition before curing at an atmosphere temperature of 80 to 200° C. Even in the case of the "uncured resin composition," in some cases, curing slightly proceeds at room temperature.

(1) Liquid Epoxy Resin

The liquid epoxy resin preferably contains an epoxycyclohexane ring or a 2,3-epoxypropyloxy group. When a thermal cationic polymerization catalyst is used, the use of a liquid epoxy resin containing an epoxycyclohexane ring is particularly preferred, because, despite that the viscosity of the liquid epoxy resin is low, cationic polymerizability is high and the physical properties after curing are excellent. Containing the 2,3-epoxypropyloxy group means that the resin is a glycidyl ether epoxy resin.

Liquid epoxy resins containing an epoxycyclohexane ring include, for example, 3,4-epoxycyclohexylmethyl 3,4-epoxycyclohexanoate (1) (CELLOXIDE 2021 P, manufactured by Daicel Chemical Industries, Ltd.; viscosity at 25° C.: 350 mPa·s), 1-(1,2-epoxy-2-propanil)-3-methyl-3,4-epoxycylohexane (2) (CELLOXIDE 3000, manufactured by Daicel Chemical Industries, Ltd.; viscosity at 25° C.: not more than 3500 mPa·s), and 3,4-epoxycyclohexanoate (3) (CELLOXIDE 2081, manufactured by Daicel Chemical Industries, Ltd.; viscosity at 25° C.: 350 mPa·s). These resins are represented by the following chemical formulae:

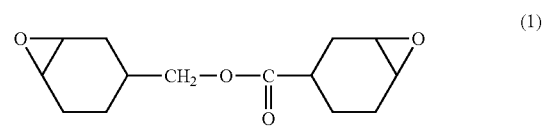

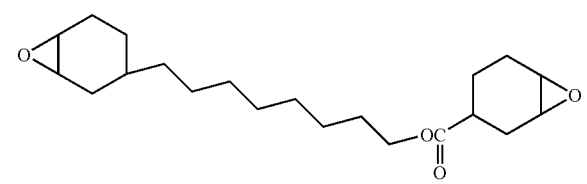

When the liquid epoxy resin contains a 2,3-epoxypropyloxy group, the 2,3-epoxypropyloxy group is preferably bonded to a six-membered carbocyclic ring. Six-membered carbocyclic rings include a benzene ring and a cyclohexane ring. The six-membered carbocyclic ring may condense with a five-membered carbocyclic ring, a six-membered carbocyclic ring or the like.

Liquid epoxy resins containing a 2,3-epoxypropyloxy group include bisphenol F diglycidyl ether, bis(4-(2,3-epoxypropyloxy)phenyl)methane (4) (EP-4901, manufactured by Asahi Denka Kogyo Ltd.; viscosity: 3500 mPa·s), hydrogenated bisphenol A diglycidyl ether, 2,2-bis(4-(2,3-epoxypropyloxy)cyclohexyl)propane (5) (Epiclon 830, manufactured by Dainippon Ink and Chemicals, Inc.), and hydrogenated bisphenol F diglycidyl ether, bis(4-(2,3-epoxypropyloxy)cyclohexyl)methane (6) (EP-4080E, manufactured by Asahi Denka Kogyo Ltd., viscosity: 2000 mPa·s; and YX 8000, manufactured by Japan Epoxy Resins Co., Ltd., viscosity: 1800 mPa·s).

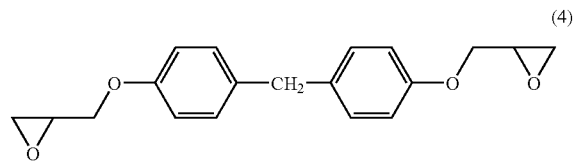

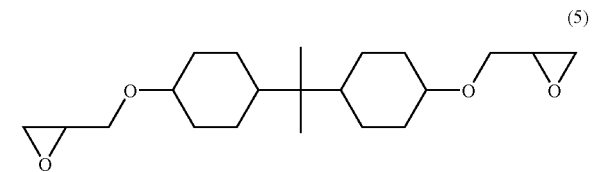

-continued

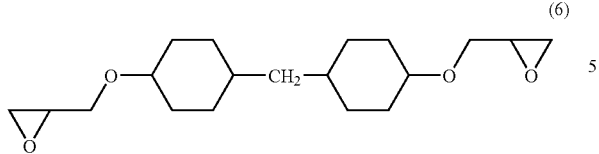
(6)

Additional liquid epoxy resins containing a 2,3-epoxypropyloxy group include diglycidyl ethers of propylene oxide adducts of bisphenol A, 2,2-bis[4-(2-(2,3-epoxypropyloxy)propyl)phenyl]propane (7) (EP-4000S, manufactured by Asahi Denka Kogyo Ltd.; viscosity: 1800 MPa·s).

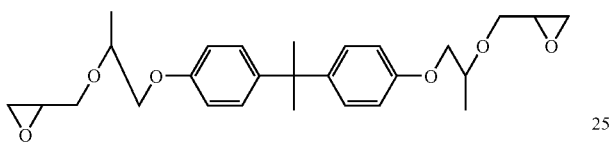
(7)

Low-viscosity epoxy resins which are generally classified as reactive diluents may also be used as the liquid epoxy resin according to the invention. The amount of the reactive diluent used is preferably not more than 30% by weight based on 100% by weight of the whole liquid epoxy resin. When the amount of the reactive diluent used is more than 30% by weight, the strength of the resin matrix after curing is sometimes lowered.

Reactive diluents include 1,4-bis(2,3-epoxypropyloxymethyl)cyclohexane (8) (EP-4085, manufactured by Asahi Denka Kogyo Ltd.; viscosity: 45 mPa·s), diglycidyl ether of dicyclopentadiene dimethanol (EP-4088, manufactured by Asahi Denka Kogyo Ltd.; viscosity: 335 mPa·s), p-t-butylphenyl glycidyl ether (10) (Denacol EX 146, manufactured by Nagase ChemteX Corporation; viscosity: 20 mPa·s), and isopropylphenyl glycidyl ether (11) (Epiclon 520, manufactured by Dainippon Ink and Chemicals, Inc.; viscosity: 15 mPa·s).

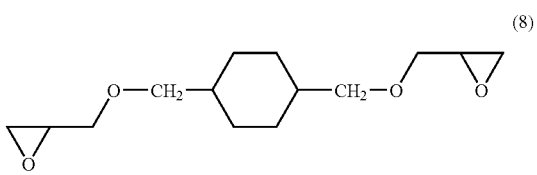
(8)

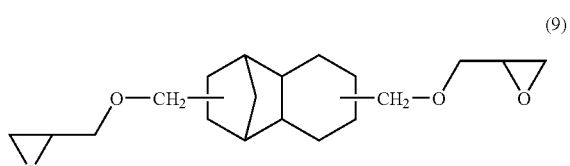
(9)

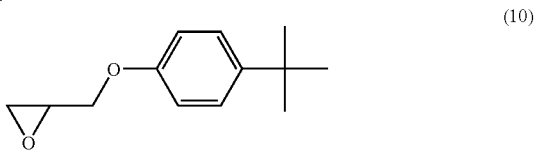
(10)

(11)

An epoxy resin which as such has a viscosity of not less than 3500 mPa·s may also be used by mixing with a low-viscosity epoxy resin or a reactive diluent to optionally bring the viscosity to not more than 3500 mPa·s. Epoxy resins which as such has a viscosity of not less than 3500 mPa·s include, for example, bisphenol A epoxy resin (12) (AER 260, manufactured by Asahi Kasei Corporation, viscosity: 14000 mPa·s), and long-chain hydrogenated bisphenol A epoxy resin (13) (YL 6834, manufactured by Japan Epoxy Resins Co., Ltd., viscosity: 80000 mPa·s).

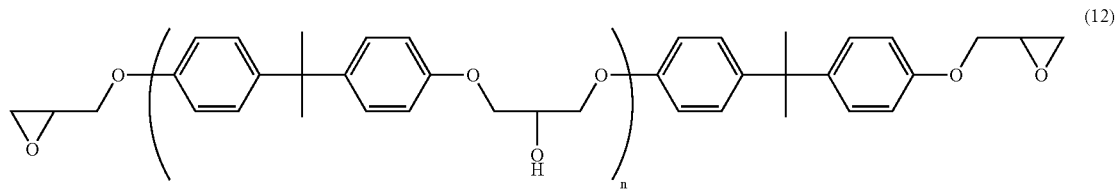
(12)

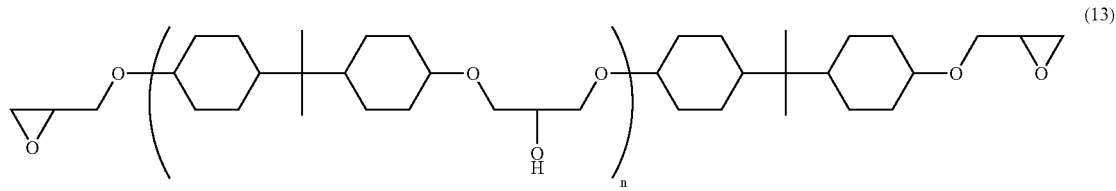
(13)

When the curing agent is a thermal cationic polymerization catalyst, the matrix resin is preferably a resin prepared by curing a liquid epoxy resin having a viscosity of not more than 3500 mPa·s at 25° C. This liquid epoxy resin is suitable when the curing agent is a thermal cationic polymerization catalyst, as well as when the curing agent is an acid anhydride.

Next, liquid epoxy resins which are mainly used when the curing agent is an acid anhydride will be explained.

Liquid epoxy resins usable herein include diglycidyl esters of dialkylcyclohexene derivatives (14) (Epikote 871, manufactured by Japan Epoxy Resins Co., Ltd.; viscosity: 650 mPa·s).

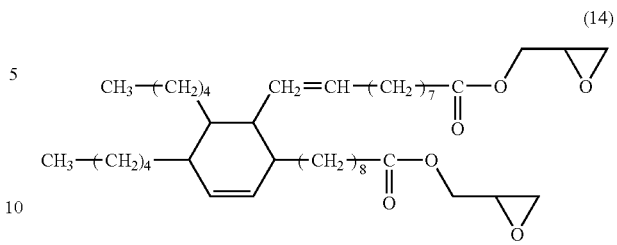
(14)

An epoxy resin which as such has a viscosity of not less than 15000 mPa·s and an epoxy resin which as such is solid may also be used by mixing a low-viscosity epoxy resin or a reactive diluent to bring the viscosity to not more than 15000 mPa·s. Epoxy resins which as such have a viscosity of not less than 15000 mPa·s include, for example, diglycidyl esters of dialkylcyclohexene derivatives (15) (Epikote 872, manufactured by Japan Epoxy Resins Co., Ltd.).

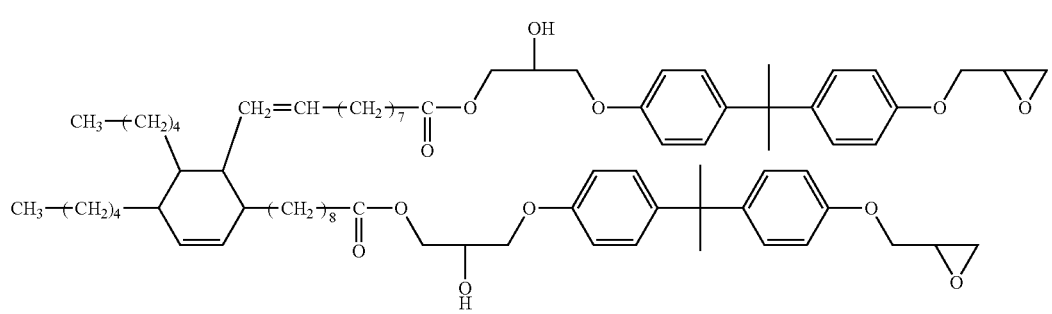
(15)

Epoxy resins which as such are solid include, for example, 3,5,3',5'-tetramethyl-4,4'-bis(2,3-epoxypropyloxy)biphenyl (16) (YX 4000, manufactured by Japan Epoxy Resins Co., Ltd.), 1,4-di-t-butyl-2,5-di(2,3-epoxypropyloxy)benzene (17) (YDC-1312, manufactured by Tohto Kasei Co., Ltd.), novolak epoxy resin (18) (RE-306, manufactured by Nippon Kayaku Co., Ltd.), novolak epoxy resin (19) (EOCN-4500, manufactured by Nippon Kayaku Co., Ltd.), novolak epoxy resin (20) (EPPN-501H, manufactured by Nippon Kayaku Co., Ltd.), and dicyclopentadiene epoxy resin (21) (HP-7200, manufactured by Dainippon Ink and Chemicals, Inc.).

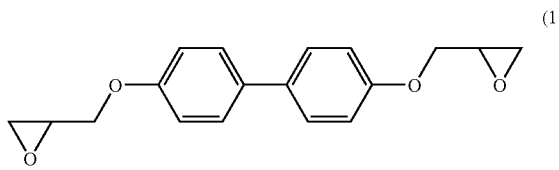
(16)

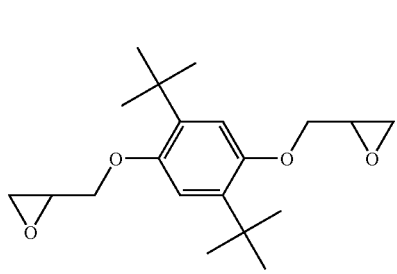
(17)

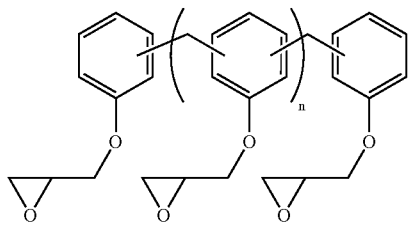
(18)

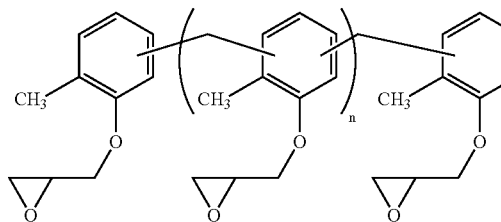
(19)

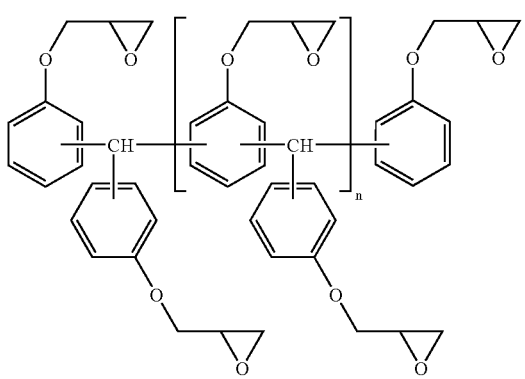
(20)

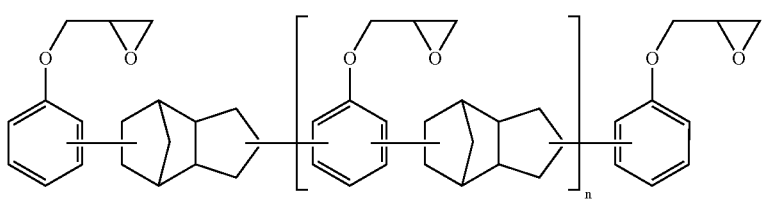
(21)

(2) Thermal Cationic Polymerization Catalyst

The thermal cationic polymerization catalyst is a catalyst which, upon heating, induces ring opening of the activated epoxy group, and examples thereof include various onium salts such as quaternary ammonium salts, phosphonium salts, and sulfonium salts, and organometal complexes.

Sulfonium salts include, for example, heterocyle derivatives represented by formulae (22) and (23) (ADEKAOPTON CP-66 and ADEKAOPTON CP-77, manufactured by Asahi Denka Kogyo Ltd.).

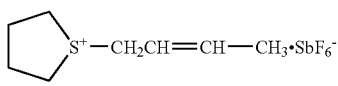
(22)

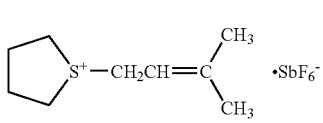
(23)

Sulfonium salts represented by formula (24) may also be used:

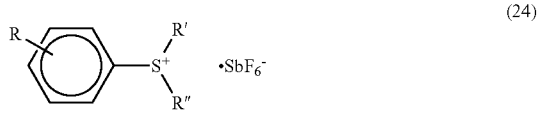
(24)

wherein R represents a substituent of the benzene ring; and R' and R", which may be the same or different, represent an optionally substituted hydrocarbon group. Examples thereof include SAN-AID SI-60L, SAN-AID SI-80L, and SAN-AID SI-100L, manufactured by Sanshin Chemical Industry Co., Ltd. Sulfonium salts usable herein include, for example, trisarylsulfoniumantimony hexafluorides. Onium salts include compounds of CI series manufactured by Nippon Soda Co., Ltd. Organometal complexes include, for example, alkoxysilane-aluminum complexes.

The cationic polymerization initiator is preferably mixed in an amount of 0.1 to 5 parts by weight, more preferably 0.3 to 3 parts by weight, based on 100 parts by weight of the uncured resin composition.

(3) Acid Anhydride

The acid anhydride preferably has an optionally hydrogenated phthalic anhydride skeleton. Acid anhydrides include, for example, methyltetrahydrophthalic anhydride (Me-THPA) (Quinhard200 (Nippon Zeon Co., Ltd.), HN-2200 (Hitachi Chemical Co., Ltd.), and Rikacid MT-500 (New Japan Chemical Co., Ltd.)); methylhexahydrophthalic anhydride (Me-HHPA) (Quinhard500 (Nippon Zeon Co., Ltd.), HN-5500 (Hitachi Chemical Co., Ltd.), and Rikacid MT-700 (New Japan Chemical Co., Ltd.)); methylnadic anhydride (25) (MHAC-P (Hitachi Chemical Co., Ltd.)); hydogenated methylnadic anhydride (26) (HNA (New Japan Chemical Co., Ltd.)); and alkyl-modified acid anhydride (27) (Epikure YH-306 and Epikure YH-307 (Japan Epoxy Resins Co., Ltd.)).

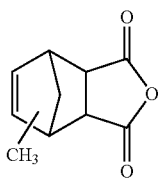

(25)

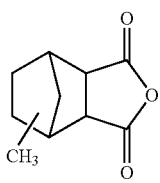

(26)

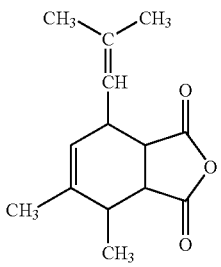

(27)

The acid anhydride is mixed in such an amount that the amount of the acid anhydride group is 0.5 to 2 moles, preferably 0.7 to 1.3 moles, based on one mole of the epoxy group in the epoxy resin. MH-700 is preferred from the viewpoints of low viscosity and rapid curing. YH-306 is preferred from the viewpoints of less susceptibility to ambient moisture and less volatilization of the acid anhydride even in the case of curing at a high temperature in a short time.

(3) Bisphenol A Epoxy Resin Having Average Molecular Weight of Not Less Than 900

In the invention, preferably, the matrix resin is a resin prepared by curing the liquid epoxy resin together with a bisphenol A epoxy resin having an average molecular weight of not less than 900. The bisphenol A epoxy resin having an average molecular weight of not less than 900 is generally solid at 25° C.

The bisphenol A epoxy resin (28) is represented by the following general formula.

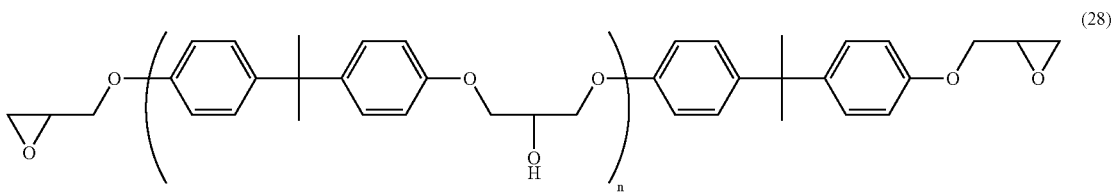

(28)

wherein n is an integer of 1 or more.

For example, Epikote 1001 (average molecular weight: 900), Epikote 1002 (average molecular weight: 1200), Epikote 1003 (average molecular weight: 1300), and Epikote 1055 (average molecular weight: 1600), manufactured by Japan Epoxy Resins Co., Ltd. may be used. Epikote 1002 is preferred because the level of an increase in viscosity of the uncured resin composition is relatively small and satisfactory toughness can easily be imparted after curing.

In the present invention, an epoxy resin comprising a hydrogenation product of bisphenol A as the repeating unit may be used instead of the bisphenol A epoxy resin (28) having an average molecular weight of not less than 900.

(4) Flexibility-imparting Agent

Flexibility-imparting agents include, for example, epoxy resin adducts of carboxylic acid-terminated aliphatic polyesters (29), for example, SD 551 (Ciba Specialty Chemicals, K.K.), may be used.

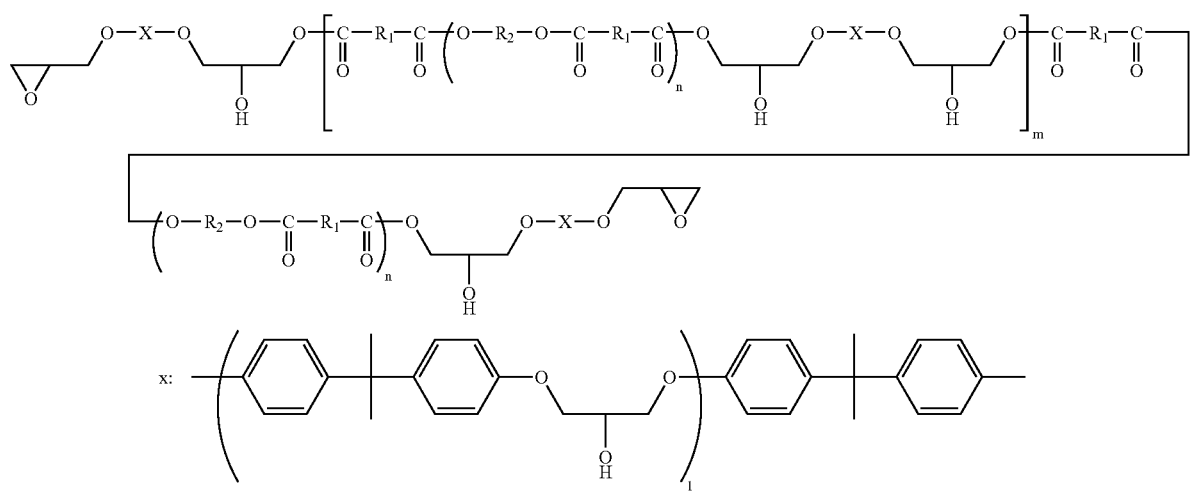

(29)

wherein n, m, and l, which may be the same or different, are an integer of not less than 1 and not more than 10000; $R_1$ represents a straight-chain or branched alkylene group having 2 to 16 carbon atoms; $R_2$ represents a straight-chain or branched alkylene group having 2 to 16 carbon atoms, a group represented by formula —$(CH_2$—$CH(CH_3)$—$O)_i$—$CH_2$—$C(CH_3)$—, or a group represented by formula —$(CH_2$—$CH_2$—$CH_2$—$CH_2$—$O)$—$CH_2$—$CH_2$—$CH_2$—$CH_2$—.

Further, SD 665 (Ciba Specialty Chemicals, K.K.) may also be used. SD 665 is a compound in which the epoxy part located at the end of SD 551 (Ciba Specialty Chemicals, K.K.) has been substituted by a group represented by formula (30).

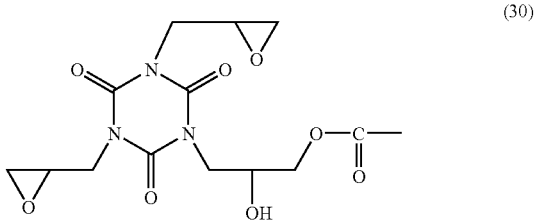

(30)

Further, hydroxyl-terminated polybutadienes (31), for example, PBR-15HT and PBR-45HT (Idemitsu Petrochemical Co., Ltd.), or acid anhydride adducts of hydroxyl-terminated polybutadiene (32) may also be used.

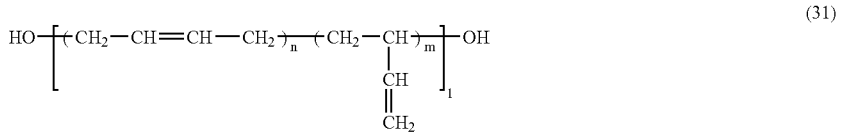

(31)

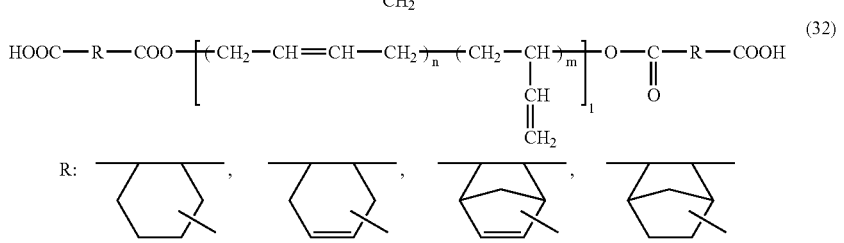

(32)

wherein n, m, and 1, which may be the same or different, are an integer of 1 or more.

Further, carboxylic acid-terminated acrylonitrile-butadiene copolymers (33) (CTBN), for example, HYCAR CTBN1300x13, HYCAR CTBN1300x8, and HYCAR CTBN1300x9 (Ube Industries, Ltd.), or epoxy resin adducts thereof (34) may also be used.

Further, 1,8-diaza-bicyclo(5,4,0)undecene 7 (DBU) and salts thereof may also be used. Examples thereof include 1,8-diaza-bicyclo(5,4,0)undecene 7 (for example, FC CURE α-1, Shikoku Corp.), DBU 2-ethyl hexanoate (for example, FC CURE α-2, Shikoku Corp.), DBU octylate (for example, U-CAT SA102, SAN-APRO LTD.), DBU phthalate (for

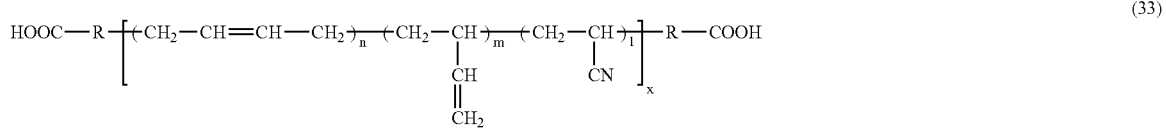

(33)

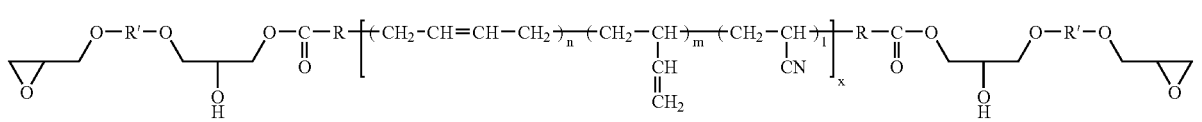

(34)

Among them, SD551 and CTBN epoxy adducts are preferred, because, since the reactivity is good, the compound can be incorporated into the crosslinked structure after curing to highly efficiently impart toughness to the cured product.

The total mixing amount of the bisphenol A epoxy resin having an average molecular weight of not less than 900 and the flexibility-imparting agent is preferably 5 to 50% by weight based on the total mixing amount of the liquid epoxy resin, the bisphenol A epoxy resin having an average molecular weight of not less than 900 and the flexibility-imparting agent, more preferably 10 to 30% by weight. The matrix resin may contain both, any one of or none of the bisphenol A epoxy resin having an average molecular weight of not less than 900 and the flexibility-imparting agent.

(5) Curing Accelerator

When the acid anhydride is used as the curing agent, the use of a curing accelerator is preferred. Imidazole derivatives may be used as the curing accelerator. Examples thereof include alkyl imidazoles such as 1-methylimidazole, 2-methylimidazole, 2-undecylimidazole, and 2-heptadecylimidazole; dialkyl imidazoles such as 1,2-dimethylimidazole and 2-ethyl-4-methylimidazole; aryl imidazoles such as 2-phenylimidazole; and 2-phenyl-4-methylimidazole, 1-benzyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-cyanoethyl-2-ethyl-4-methylimidazolium trimelitate, 1-cyanoethyl-2-undecylimidazolium trimelitate, 1-cyanoethyl-2-phenylimidazolium trimelitate, 2,4-diamino-6-(2'-methylimidazolyl-(1'))-ethyl-s-triazine, 2,4-diamino-6-(2'-undecylimidazolyl)-ethyl-s-triazine, 2,4-diamino-6-(2'-ethyl-4-methylimidazolyl-(1'))-ethyl-s-triazine, 2,4-diamino-6-(2'-methylimidazolyl-(1'))-ethyl-s-triazine-isocyanuric acid adduct, 2-phenylimidazole-isocyanuric acid adduct, 2-methylimidazole-isocyanuric acid adduct, 2-phenyl-4,5-dihydroxymethylimidazole, 2-phenyl-4-methyl-5-hydroxymethylimidazole, and 1-cyanoethyl-2-phenyl-4,5-di(2-cyanoethoxy)methylimidazole.

example, U-CAT SA810, SAN-APRO LTD.), and tetraphenyl borate of DBU (for example, U-CAT 5002, SAN-APRO LTD.).

Phosphines and phosphonium salts may also be used. Phosphines include monophosphines and diphosphines. Monophosphines include, for example, triarylphosphines such as triphenylphosphine, tritolylphosphine, tris(methoxyphenyl)phosphine, and tris(parachlorophenyl)phosphine; dicycloalkylarylphosphines such as dicyclohexylphenylphosphine; and diaryldicycloalkylphosphines such as diphenylcyclohexylphosphine. Diphosphines include, for example, α,ω-bisdiaryl alkanes such as bis(diphenylphosphino)methane, 1,2-bis(diphenylphosphino)ethane, 1,3-bis(diphenylphosphino)propane, 1,4-bis(diphenylphosphino)butane, and 1,5-bis(diphenylphosphino)pentane. Phosphonium salts include, for example, tetraalkylphosphonium halides such as tetra-n-butylphosphonium bromide; tetraarylphosphonium halides such as tetraphenylphosphonium bromide; alkyltriarylphosphonium halides; and tetraarylphosphonium tetraaryl borates such as tetraphenylphosphonium tetraphenyl borate.

Tertiary amines may also be used. Examples thereof include 1,3,5-trisdimethylaminomethylphenol (for example, ADEKA HARDENER EHC-30, Asahi Denka Kogyo Ltd.). Boron trichloride complexes of tertiary amines (DY 9577, Ciba Specialty Chemicals, K.K.) may also be used.

These curing accelerators per se are liquids or epoxy resin-soluble solids and are dissolved in the uncured resin composition before use. The amount of the curing accelerator added is preferably 0.8 to 20 parts by weight, more preferably 1 to 8 parts by weight, based on 100 parts by weight of the epoxy resin.

Microcapsule type latent curing accelerators commonly used for prolonging the shelf life of one-pack type acid anhydride curing-type epoxy resin compositions, for example, Novacure HX-3088, HX-3741, and HX-3921 (Asahi Chemical Industry CO, Ltd.), may be used for prolonging pot life while enjoying fast curing. These accelerators which are in the form of fine particles having a diameter of about 5 μm cannot be penetrated into narrow gaps. Therefore, when these accelerators and the above-described resin dissolution-type accelerators are used in combination, the resin composition penetrated into gaps having a size smaller than the particle diameter of the microcapsule-type accelerator can also be efficiently cured.

The uncured resin composition preferably contains a very small amount of an antifoaming agent. Silicones may be used as the antifoaming agent.

The process for producing a glass fiber reinforced resin linear material used as the tension member in the optical fiber cable and comprising glass fibers having an elongation at break of not less than 5% and a matrix resin is characterized by comprising the step of curing a liquid epoxy resin having a viscosity of not more than 15000 mPa·s at 25° C. in the presence of a thermal cationic polymerization catalyst or an acid anhydride.

An uncured resin composition comprising at least the liquid epoxy resin and the thermal cationic polymerization catalyst or an acid anhydride is preferably cured at an atmosphere temperature of 80 to 200° C. in 10 min or shorter, more preferably at an atmosphere temperature of 90 to 180° C. in 5 min or shorter, still more preferably at an atmosphere temperature of 90 to 160° C. in 3 min or shorter. The reason for this is as follows. When the curing time is shorter, the tensile speed of the glass fibers can be increased. Therefore, the length of the mold for curing can be reduced, and, further, the production time can be shortened.

The viscosity of the uncured resin composition is preferably not more than 10000 mPa·s at 25° C., more preferably not more than 9000 mPa·s at 25° C., from the viewpoint of facilitating the penetration of the uncured resin composition into among the glass fibers to improve the wettability.

EXAMPLES

The invention will be explained in more detail with reference to the following examples. However, the invention is not limited to these examples only.

Examples 1 to 3

High-strength glass fibers sold by Nitto Boseki Co., Ltd. (tradename "T-GLASS," elongation at break 0.5.5%, modulus of elasticity 84.3 GPa) were provided. T-GLASS contained 65% by weight of $SiO_2$, 23% by weight of $Al_2O_3$, 11% by weight of MgO, and less than 1% by weight of $ZrO_2$. Detailed specifications of the high-strength glass fibers are shown in Table 1.

TABLE 1

| Product | Count | Treatment | Fiber diameter | Density | Tensile strength | Elastic modulus in tension | Elongation at break |
| --- | --- | --- | --- | --- | --- | --- | --- |
| RST28 PA-535 | 280 g/km | Epoxysilane treatment | 7 μm | 2.49 g/cm³ | 4.65 GPa | 84.3 GPa | 5.5% |

Expoxy resin produced in the presence of a thermal cationic polymerization catalyst was used as matrix resin. Formulations of Examples 1 to 3 are shown in Table 2.

TABLE 2

| | Component | Ex. 1 | Ex. 2 | Ex. 3 |
| --- | --- | --- | --- | --- |
| (1) | CELLOXIDE 2021P | 80 | 40 | 56 |
| (2) | CELLOXIDE 2081 | — | 40 | 24 |
| (3) | Epikote 1002 | 20 | 20 | 20 |
| (4) | SD551 | 10 | 10 | 10 |
| (5) | SI-100L | 1 | 1 | 1 |
| (6) | ST86PA (antifoaming agent) | 0.01 | 0.01 | 0.01 |

CELLOXIDE 2021P and CELLOXIDE 2081, which are liquid epoxy resin, were obtained from Daicel Chemical Industries, Ltd. Epikote 1002, which is a bisphenol A epoxy resin having an average molecular weight of 1200, was obtained from Japan Epoxy Resins Co., Ltd. SD551, which is an epoxy resin adduct of a carboxylic acid-terminated aliphatic polyester serving as a flexibility-imparting agent, was obtained from Ciba Specialty Chemicals, K.K. SI-100L, which is a thermal cationic polymerization catalyst, refers to SAN-AID SI-100L obtained from Sanshin Chemical Industry Co., Ltd. ST86PA, which is dimethyl polysiloxane, was obtained from Dow Corning Toray Silicone Co., Ltd.

The components (1), (2), (3), and (6) were first mixed together in a mixing ratio specified in Table 2, and the mixture was stirred in a kettle at 100° C. under reduced pressure for one hr for homogeneous dissolution. Thereafter, the component (4) was charged in an amount indicated in Table 2, and the mixture was stirred under reduced pressure for homogeneous dissolution. The solution was cooled to room temperature, a predetermined amount of the component (5) was charged into the kettle, and the mixture was stirred under the reduced pressure for 30 min. The mixture was filtered through a 110-mesh filter and was discharged into a lightproof container to provide an uncured resin composition.

The uncured resin composition was filled into an impregnation tank, which was previously temperature controlled at a temperature of 30° C., and was kept at 30° C. In this case, the viscosity of the resin within the impregnation tank was 3000 mPa·s for Example 1, 5000 mPa·s for Example 2, and 6000 mPa·s for Example 3.

Figure 2:
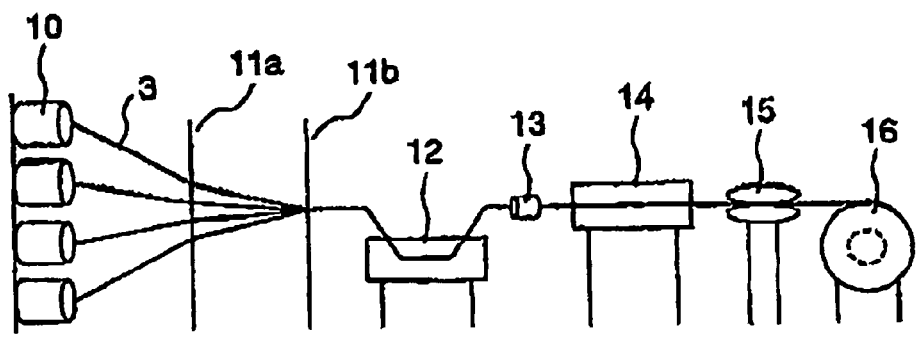
FIG. 2 is an explanatory view of a preferred embodiment of the production process of a glass fiber reinforced resin linear material for use as a tension member of the optical fiber cable according to the invention.

Yarn was drawn from a plurality of creels 10 shown in FIG. 2. The yarn was passed through a guide 11a and guide 11b for convergence. The yarn was then immersed in an impregnation tank 12 to impregnate the yarn with the uncured resin composition. The linear material was then squeezed through a squeezing nozzle 13 into a predetermined shape to remove the excess uncured resin composition and was led to an about 3 m-long mold 14 for hot molding heated at 120 to 130° C. to cure a resin composition. Since the tensile speed of the yarn was about 1.5 m/min, the resin composition was cured in about 2 min. The cured glass fiber reinforced resin linear material was passed through a pair of caterpillars 15 and was wound on a winding device 16. As a result, a glass fiber reinforced resin composition having a glass fiber content of about 70% by weight and an outer diameter of 0.3 mm was obtained. The glass fiber reinforced resin linear material was not coated with the thermoplastic resin. The caterpillar 15 is used for applying tractive force and may be omitted if desired.

Separately, only the uncured resin composition was cured at 120 to 130° C., and the resin thus obtained was measured for the modulus of elasticity and the elongation at break. The results are shown in Table 3.

TABLE 3

|   | Modulus of elasticity | Elongation at break |
|---|---|---|
| Ex. 1 | 3.8 GPa | 5.1% |
| Ex. 2 | 2.1 GPa | 6.8% |
| Ex. 3 | 3.2 GPa | 5.7% |

The flexibility (minimum bending diameter) of the glass fiber reinforced resin linear material was measured by the following method. The glass fiber reinforced resin composition was cut into a length of about 100 mm. Both ends of each sample were grasped by a hand. The center part of the sample was wound around a clean steel cylinder having various diameters, and the diameter of the steel cylinder at which breaking began from the outer periphery or inner periphery of the sample was determined. The number of samples, n, was 10, and the average value was determined. The results are shown in Table 4.

TABLE 4

|   | Glass fiber content | Outer diameter d | Minimum bending diameter D | D/d | Form of failure |
|---|---|---|---|---|---|
| Ex. 1 | 70.5 wt % | 0.30 mm | 6.0 mm | 20.0 | Breaking |
| Ex. 2 | 68.1 wt % | 0.31 mm | 5.5 mm | 17.7 | Buckling |
| Ex. 3 | 72.2 wt % | 0.29 mm | 5.0 mm | 16.5 | Breaking |

As is apparent from Table 4, it cannot be said that the flexibility of the glass fiber reinforced resin composition increases with increasing the elongation at break of the epoxy resin as the matrix resin. When the modulus of elasticity is low, before breaking of the glass fiber reinforced resin composition per se, the sectional form is broken resulting in flat buckling which increases apparent minimum bending diameter D, although this depends upon the accuracy of the sectional form of the glass fiber reinforced resin composition. Therefore, the higher the elongation at break of the matrix resin, the better the results. The optimal elongation at break (%) should be determined by satisfactorily taking into consideration the modulus of elasticity of the matrix resin and the adhesion at the interface of the resin and the fibers. In this case, as is apparent from the invention, in order to provide a glass fiber reinforced resin composition in which the ratio of the minimum bending diameter D to the diameter d of the linear material, D/d, is not more than 20 and d≦0.6 mm, it is preferred to satisfy the requirement that the glass fiber and the epoxy resin each have an elongation at break of not less than 5% and the epoxy resin has a modulus of elasticity of not less than 2 GPa.

Examples 4 and 5

The dimension of a mold was changed according to the combination of the matrix resin with the glass fibers in Example 3 to mold a glass fiber reinforced resin composition having an outer diameter of 0.42 mm (Example 4) and a glass fiber reinforced resin composition having an outer diameter of 0.51 mm (Example 5). In the same manner as in Examples 1 to 3, the minimum bending diameter was measured and was found to be 7.0 mm and 9.0 mm which were respectively 16.7 times and 17.6 times larger than the diameter of the linear materials.

Examples 6 and 7

In the same manner as in Examples 1 to 5, high-strength glass fibers sold by Nitto Boseki Co., Ltd. (tradename "T-GLASS," elongation at break 5.5%, modulus of elasticity 84.3 GPa) were provided. Epoxy resin using an acid anhydride was provided as the matrix resin. Formulations of Examples 6 and 7 are shown in Table 5.

TABLE 5

|   | Component | Ex. 6 | Ex. 7 |
|---|---|---|---|
| (1) | Epikote 871 | 40 | 11.3 |
| (2) | AER280 | 40 | — |
| (3) | CELLOXIDE 2021P | 20 | 26.3 |
| (4) | Epikote 1002 | — | 20 |
| (5) | SD551 | — | 10 |
| (6) | Diisononyl adipate | 10 | — |
| (7) | ST86PA | 0.01 | 0.01 |
| (8) | MHAC-P | 61.3 | — |
| (9) | MH-700 | — | 42.4 |
| (10) | EHC-30 | 0.8 | 0.8 |
| (11) | U-CAT SA102 | 2 | 2 |

Epikote 871, which is a diglycidyl ester of a dialkylcyclohexene derivative (14), was obtained from Japan Epoxy Resins Co., Ltd. AER 260, which is a bisphenol A epoxy resin (12), was obtained from Asahi Kasei Corporation. CELLOXIDE 2021P, which is a liquid epoxy resin, was obtained from Daicel Chemical Industries, Ltd. Epikote 1002, which is a bisphenol A epoxy resin having an average molecular weight of 1200, was obtained from Japan Epoxy Resins Co., Ltd. SD551, which is an epoxy resin adduct of a carboxylic acid-terminated aliphatic polyester serving as a flexibility-imparting agent, was obtained from Ciba Specialty Chemicals, K.K. ST86PA, which is dimethyl polysiloxane, was obtained from Dow Corning Toray Silicone Co., Ltd. MHAC-P, which is methylnadic anhydride as an acid anhydride, was obtained from Hitachi Chemical Co., Ltd. MH-700, which is methylhexahydrophthalic anhydride, was obtained as Rikacid MH-700 from New Japan Chemical K.K. EHC30, which is 1,3,5-trisdimethyl aminomethylphenol serving as a curing accelerator, was obtained as ADEKA HARDENER EHC-30 from Asahi Denka Kogyo Ltd. U-CAT SA102, which is a salt of 1,8-diaza-bicyclo(5,4,0) undecene-7-octylic acid serving as a curing accelerator, was obtained from SAN-APRO LTD.

The components (1), (2), (3), (4), and (7) were mixed together at a predetermined mixing ratio, and the mixture was stirred in a vertical mixer at 100° C. under reduced pressure for one hr to prepare a fully homogeneous solution. Thereafter, the solution was cooled to room temperature. The components (5) and (6) were added in respective predetermined amounts, and the mixture was stirred under reduced pressure for homogeneous dissolution. The solution was filtered through a 60-mesh filter to prepare a formulation R. Separately, the components (8), (9), (10), and (11) were charged at a predetermined mixing ratio into a kettle, and the mixture was stirred under reduced pressure for one hr for homogeneous dissolution. Thereafter, the solution was filtered through a 110-mesh filter to prepare a formulation H. Thereafter, the formulation R and the formulation H were mixed together at a predetermined mixing ratio to prepare an uncured resin composition.

The uncured resin composition was filled into an impregnation tank, which was previously temperature controlled at a temperature of 20° C., and was kept at a constant temperature of 20° C. In this case, the viscosity of the uncured resin composition in the impregnation tank was 2000 mPa·s for Example 6 and 6500 mPa·s for Example 7.

In the same manner as in Examples 1 to 3, glass fiber reinforced resin linear materials having a glass fiber content of about 70% by weight were prepared with the apparatus shown in FIG. 2. Next, in the same manner as in Examples 1 to 3, the flexibility (minimum bending diameter) of the glass fiber reinforced resin linear materials was measured. The results are shown in Table 6.

TABLE 6

| | Glass fiber content | Outer diameter d | Minimum bending diameter D | D/d | Tolerable tension | Form of failure |
|---|---|---|---|---|---|---|
| Ex. 6 | 71.3 wt % | 0.31 mm | 6.0 mm | 19.4 | 1.35 kgf | Buckling |
| Ex. 7 | 69.8 wt % | 0.31 mm | 5.5 mm | 17.7 | 1.32 kgf | Breaking |

Only the uncured resin compositions were cured at 120 to 130° C. For the resins thus obtained, the modulus of elasticity and the elongation at break were measured. The results are shown in Table 7.

TABLE 7

| | Initial viscosity | After 20° C./24 hr | Modulus of elasticity | Elongation at break |
|---|---|---|---|---|
| Ex. 6 | 2000 | 6500 | 1.9 GPa | 7.0% |
| Ex. 7 | 3500 | 9500 | 3.2 GPa | 5.2% |

As shown in Table 7, for Example 6, the modulus of elasticity of the matrix resin is low. Further, as shown in Table 6, in the glass fiber resin composition thus obtained, before breaking, the sectional form is broken resulting in flat buckling which increases the minimum bending diameter D.

Comparative Example

For comparison, a glass fiber reinforced resin linear material was molded in the same manner as described above, except that glass fibers having an elongation at break of not more than 5% were used as the glass fibers and a heat-curable vinyl ester resin was used as the matrix resin.

The glass fibers were E glass sold by Nitto Boseki Co., Ltd. (elongation at break 4.8%, modulus of elasticity 72.5 GPa). The E-glass comprised 52 to 56% by weight of $SiO_2$, 12 to 16% by weight of $Al_2O_3$, 15 to 25% by weight of CaO, 0 to 6% by weight of MgO, 8 to 13% by weight of $B_2O_3$, and 0 to 1% by weight of $Na_2O$ and $K_2O$.

A novolak vinyl ester resin (POLYHOPE H8100, Japan Composite Co., LTD.) was used as the vinyl ester resin, and 0.5 Phr of 6% cobalt naphthenate as a curing accelerator and 1.0 Phr of 55% MEKPO as a curing agent were added and mixed. The vinyl ester resin cured according to the above formulation had a tensile strength of 65 MPa, a flexural modulus of 3.8 GPa, and an elongation at break of 2.5%. A guide plate and a guide were passed through an impregnation tank filled with the resin to lead the glass fibers, thereby impregnating the fibers with the resin, The impregnated fibers were then passed through a die to squeeze the excess resin and was led into an about 3 m-long mold for hot molding to cure the resin, and the resin was then wound on a winding device.

The novolak vinyl ester resin was filled into the impregnation tank which was previously temperature controlled at a temperature of 25° C. The viscosity of the resin within the impregnation tank controlled at 25° C. was 300 mPa·s. The inner diameter of the mold for hot molding was 0.3 mm (Comparative Example 1), 0.4 mm (Comparative Example 2), and 0.5 mm (Comparative Example 3). Thus, glass fiber reinforced resin compositions having a glass fiber content of about 70% by weight were prepared.

The glass fiber reinforced resin composition was cut into a length of about 100 mm. Both ends of each sample were grasped by a hand. The center part of the sample was wound around a clean steel cylinder having various diameters, and the diameter of the steel cylinder at which breaking began from the outer periphery or inner periphery of the sample was determined. The results are shown in Table 8.

TABLE 8

| Epoxy resin | Glass fiber | Content | Outer diameter d | Minimum bending diameter D | D/d | Form of failure |
|---|---|---|---|---|---|---|
| POLYHOPE H8100 | E glass | 70.8 wt % | 0.32 mm | 9.0 mm | 28.1 | Breaking |
| POLYHOPE H8100 | E glass | 70.5 wt % | 0.41 mm | 12.0 mm | 29.2 | Breaking |
| POLYHOPE H8100 | E glass | 71.1 wt % | 0.49 mm | 14.0 mm | 28.6 | Breaking |

The results of Examples 1 to 7 and Comparative Examples 1 to 3 are summarized in Table 9.

TABLE 9

|  | Example | | | | | | | Comparative Example | | |
|---|---|---|---|---|---|---|---|---|---|---|
|  | 1 | 2 | 3 | 4 | 5 | 6 | 7 | 1 | 2 | 3 |
| Modulus of elasticity Ef of glass fiber, GPa | 84.8 | 84.3 | 84.3 | 84.3 | 84.3 | 84.3 | 84.3 | 72.5 | 72.5 | 72.5 |
| Elongation at break of glass fiber, % | 5.5 | 5.5 | 5.5 | 5.5 | 5.5 | 5.5 | 5.5 | 4.8 | 4.8 | 4.8 |
| Modulus of elasticity Em of matrix resin, GPa | 3.8 | 2.1 | 3.2 | 3.2 | 3.2 | 1.9 | 3.2 | 3.8 | 3.8 | 3.8 |
| Elongation at break of matrix resin, % | 5.1 | 6.8 | 5.7 | 5.7 | 5.7 | 7.0 | 5.2 | 2.5 | 2.5 | 2.5 |
| d, mm | 0.8 | 0.31 | 0.29 | 0.42 | 0.51 | 0.31 | 0.31 | 0.32 | 0.41 | 0.49 |
| D/d | 20 | 17.7 | 16.5 | 16.7 | 17.6 | 19.4 | 17.7 | 28.1 | 29.2 | 28.6 |
| Ef/Em | 22.2 | 40.1 | 26.3 | 26.3 | 26.3 | 44 | 26.3 | 19.1 | 19.1 | 19.1 |
| Elongation at break of matrix resin/elongation at break of glass fiber | 0.93 | 1.24 | 1.04 | 1.04 | 1.04 | 1.27 | 0.95 | 0.52 | 0.52 | 0.52 |
| Glass fiber content Vf, % | 70.5 | 68.1 | 72.2 | 72.2 | 72.2 | 71.3 | 69.8 | 70.8 | 70.5 | 71.1 |

Figure 5:
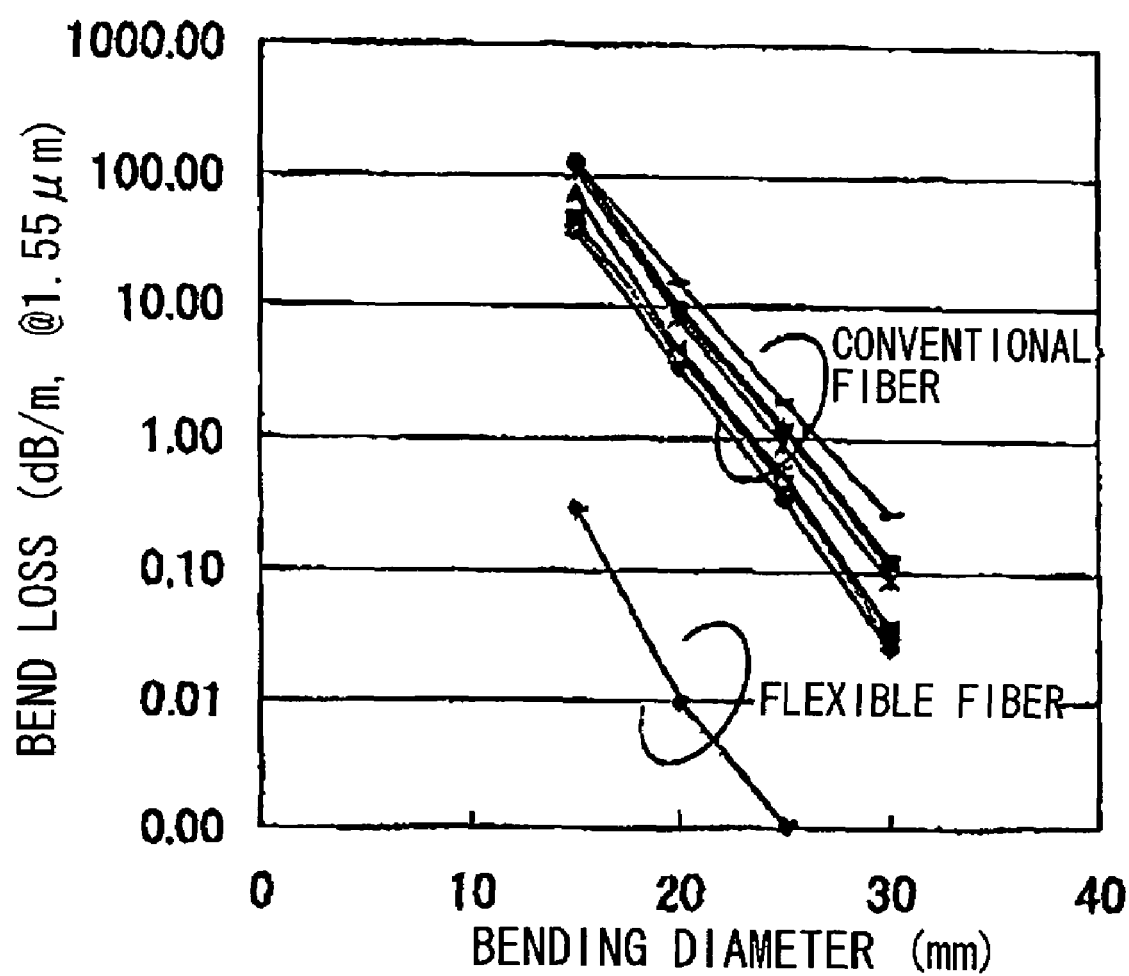
FIG. 5 is a diagram showing the relationship between the bending diameter and the bend loss of optical fibers.

An optical fiber cable was prepared using the glass fiber reinforced resin linear material prepared in Example 6 as a tension member. Two tension members each comprising the glass fiber reinforced resin linear material prepared in Example 6, which had a 0.17 mm-thick coating of an adhesive polyolefin provided on the outer periphery thereof, were used. The optical fiber cable used had a difference in refractive index between the core and the clad of 0.32% and a mode field diameter of 8.6 µm. The tension members and the optical fibers were integrally molded with a flame retardant polyolefin to prepare an optical fiber cable having a structure shown in FIG. 3. As shown in FIG. 5, this optical fiber cable had a low bend loss. This optical fiber cable was subjected to a 1.3-kgf tensile test. As a result, it could be confirmed that the tensile strain was 0.28% and the tolerable tensile strain satisfying the service life necessary for the optical fibers was not more than 0.3%.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical fiber cable, comprising:
an optical fiber core wire; and
a tension member, said tension member being formed of a glass fiber reinforced resin linear material comprising glass fibers and a matrix resin, said glass fiber reinforced resin linear material satisfying the following requirements:
   (1) $(EfVf+EmVm)d^2 \geq 8.3/n$
wherein Ef represents the modulus of elasticity of glass fibers, GPa; Vf represents the content of glass fibers, %/100; Em represents the modulus of elasticity of matrix resin, GPa; Vm represents the content of matrix resin, %/100; d represents the diameter of tension member, mm; and n represents the number of tension members used in optical fiber cable;
   (2) $(Ef/Em) \geq 22$;
   (3) $Vf = 0.6$ to $0.88$; and
   (4) an elongation at break of glass fibers of not less than 5% and an elongation at break of matrix resin of not less than 5%.

2. The optical fiber cable according to claim 1, wherein: Em is not less than 2 GPa.

3. The optical fiber cable according to claim 1, wherein: the ratio of the elongation at break of the matrix resin to the elongation at break of the glass fibers (elongation at break of the matrix resin/elongation at break of the glass fibers) is 0.93 to 1.27.

4. The optical fiber cable according to claim 1, wherein: the ratio of the minimum bending diameter D of the glass fiber reinforced resin linear material to the diameter d of the glass fiber reinforced resin linear material, D/d, is not more than 20.

5. The optical fiber cable according to claim 4, wherein: d is not more than 0.6 mm.

6. The optical fiber cable according to claim 1, wherein: in said glass fiber reinforced resin linear material, the glass fibers have an elongation at break of not less than 5%, and the matrix resin has been prepared by curing, with a thermal cationic polymerization catalyst or an acid anhydride, a liquid epoxy resin having a viscosity of not more than 15000 mPa·s at 25° C. before curing.

7. The optical fiber cable according to claim 1, wherein; the optical fibers in the optical fiber core wire are single mode fibers having a mode field diameter of 8.0 to 8.8 µm.

8. The optical fiber cable according to claim 1, wherein: the optical fibers in the optical fiber core wire have a plurality of holes in the periphery of the core.

9. An optical fiber cable, comprising:
an optical fiber core wire; and
a tension member, said tension member being a glass fiber reinforced resin linear material comprising glass fibers having an elongation at break of not less than 5% and a matrix resin prepared by curing, with a thermal cationic polymerization catalyst or an acid anhydride, a liquid epoxy resin having a viscosity of not more than 15000 mPa·s at 25° C. before curing.

* * * * *